United States Patent [19]
Sommerfeld

[11] Patent Number: 5,813,803
[45] Date of Patent: Sep. 29, 1998

[54] TEMPLATE FOR LOCATING DRAWER PULLS

[76] Inventor: Marc S. Sommerfeld, 40328 220th St., Le Mars, Iowa 51031

[21] Appl. No.: 824,815

[22] Filed: Mar. 26, 1997

[51] Int. Cl.$^6$ .................................................. B23B 47/28
[52] U.S. Cl. ...................................... 408/115 R; 408/103
[58] Field of Search ........................ 408/97, 103, 115 R

[56] References Cited

U.S. PATENT DOCUMENTS

| | | | |
|---|---|---|---|
| 2,342,033 | 2/1944 | Barabas | 408/97 |
| 2,710,454 | 6/1955 | Kershaw | 408/115 R |
| 2,838,966 | 6/1958 | Campbell | 408/115 R |
| 2,949,798 | 8/1960 | Berta, Jr. | 408/115 R |
| 3,775,857 | 12/1973 | Handy | 408/115 R |
| 4,579,485 | 4/1986 | Connor et al. | 408/115 R |
| 5,064,319 | 11/1991 | Ericksen | 408/115 R |
| 5,507,607 | 4/1996 | Ericksen et al. | 408/115 R |

FOREIGN PATENT DOCUMENTS

| | | | |
|---|---|---|---|
| 796057 | 6/1958 | United Kingdom | 408/115 R |

*Primary Examiner*—Daniel W. Howell

[57] ABSTRACT

A template for locating of attaching points for drawer pulls. The template is designed to lie on the upper edge of the drawer front and to be adjustable laterally. The members for the drawer pull are also vertically adjustable and provide proper spacing.

9 Claims, 2 Drawing Sheets

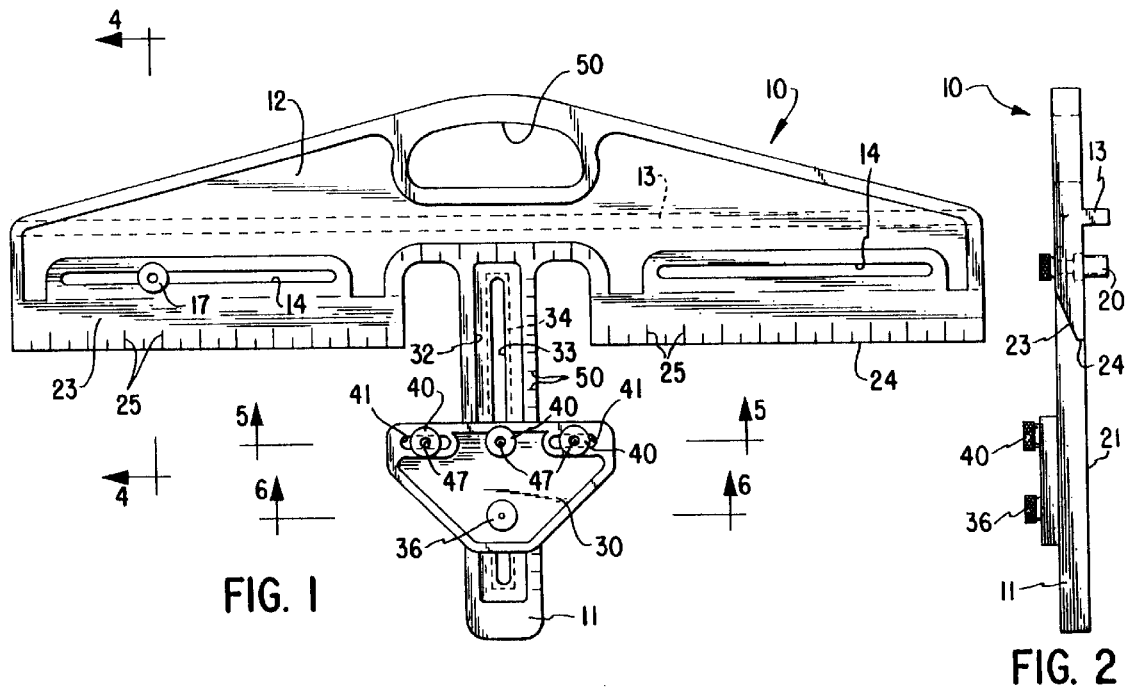
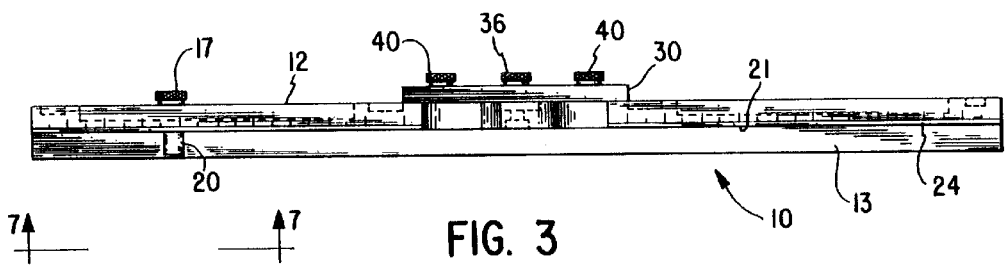
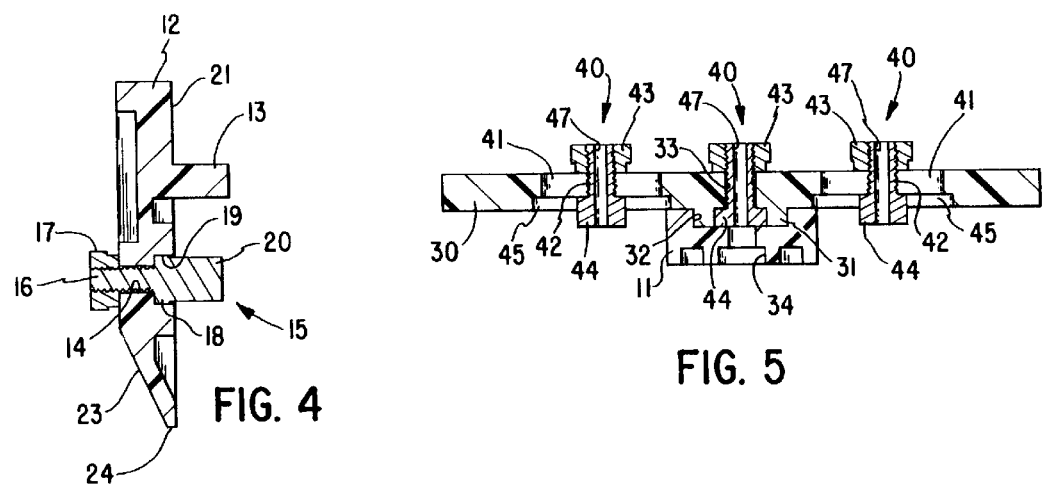

TEMPLATE FOR LOCATING DRAWER PULLS

BACKGROUND AND SUMMARY OF THE INVENTION

This invention pertains to templates, and particularly to a template designed to locate accurately the fastening points on the front surface of a drawer by which the drawer pull is fastened to the drawer.

In most furniture building operations, a premium is placed on appearance. That applies with considerable emphasis on the location of the devices by which drawers and doors are opened. The devices, commonly called drawer pulls, are used on almost any kind of cabinet specifically including such bedroom furniture as dressers, vanities, bedside cabinets, and the like as well as on kitchen cabinets, hutch cabinets and others. On all of these items, it is important that the drawer front present a symmetrical image either by proper placement of duplicate drawer pulls or proper centering of a single pull.

The present invention provides a device adapted to rest on the upper edge of the front of the drawer and to provide proper spacing from the edges of the drawer and from the top of the drawers without the need for measuring the spacing each time it is used. The device is specifically useful for custom cabinet making where it would be customary to measure distances. With the device of the present invention, merely placing the device will give the location of proper fastening points for the pulls.

DESCRIPTION OF THE DRAWINGS

FIG. 1 is a plan view of the template of the present invention,

FIG. 2 is an edge view of the template from the left side,

FIG. 3 is an end view of the template,

FIG. 4 is a sectional view from line 4—4 of FIG. 1,

FIG. 5 is a sectional view from line 5—5 of FIG. 1,

DESCRIPTION

Figure 6:
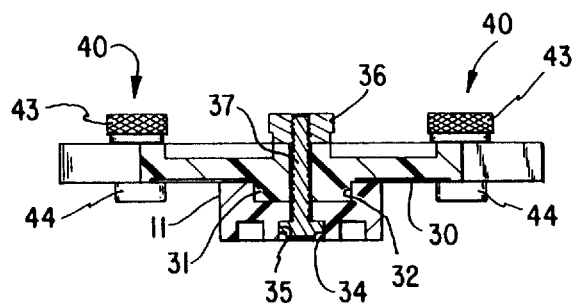
FIG. 6 is a sectional view from line 6—6 of FIG. 1.
Figure 7:
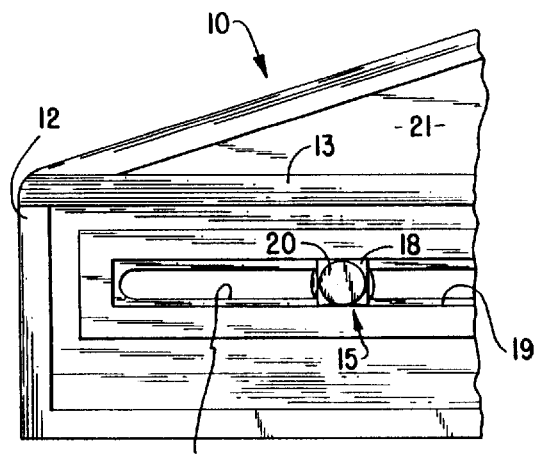
FIG. 7 is a partial rear view from line 7—7 of FIG. 3.

Briefly this invention comprises a template for locating the attachment points for drawer pulls, doorknobs on cabinet doors or the like. The template will allow adjustments both vertically and laterally on the face of the drawer or door so that the holes for screws or bolts or other fasteners on that face can be accurately located and centered and then can be repeated on similar pieces.

More specifically and referring to the drawings, the template includes a body 10 in a roughly T-shape having a leg 11 and a cross member 12 formed unitarily. The cross member 12 is formed with a substantial rib 13 extending longitudinally of that member. Except for that rib, the reverse side of the cross member 12 is flat so that it will lie flat against the drawer front or the cabinet door.

The cross member is symmetrical on either side of the leg 11. On the cross member at each side of the leg, a slot 14 is formed also longitudinally of the cross member. These slots 14 are below (in the direction of the leg 11) the rib. An edge member 15 is slidably disposed in at least one of these slots. Each member 15 includes a threaded stem 16 (FIG. 4) threadably engaging a knurled nut 17. The stem 16 extends through the slot 14 and is threaded into the nut 17. The slot 14 is broadened on the reverse side to form a grove 19 into which a square or other flat sided head 18 of the stem 11 will fit and be held from turning. Thus, the member can be moved to a desired position in the slot and be held there by tightening the knurled nut 17 on the stem 16. The member 15 also includes a cylindrical extension 20 extending beyond the flat rear surface 21 of this cross member 12 by a distance approximately equal to the thickness of a rib 13. This dimension should also approximate the thickness of a drawer front or cabinet door on which the device is used. At present that thickness would be of the order of three-fourths (¾) of an inch or about two centimeters.

The front of the cross member has a tapered lower side 23 tapering to a thin edge 24. On this tapered side 23 are placed lines 25 for measuring the distance from the center of the T-member 12. Because these lines measure the distance from the center, it is easy to space the leg 11 in the center of a drawer front (for example) by just setting the same measurement on both the right and left-hand scales. Then, the edge member 15 can either one or both be set to the edge of the drawer front for repeated settings. The thin edge 24 of the member by its thinness is useful in reducing errors which might be caused by parallax.

The leg 11 extends downwardly from the cross member 12 and receives a metering slide 30. This slide includes a tongue 31 slidably fitted into a groove 32 formed in the leg 11. A slot 33 (FIG. 1) extending completely through the leg 11 is centered in the groove 32, and both extend substantially the length of the leg 11. By these means, the slide 30 can be adjustably located anywhere along the length of the leg 11. A groove 34 on the underside of the leg 11 and formed in the rear surface (opposite the groove 32) is also used to hold a head 35 having flat sides fitting the edges of the groove 34 so that it will not turn as the knurled nut 36 is used to tighten the screw 37 to provide a clamping device.

Three drill guides 40 are held by the slide 30. A first guide is placed in the center laterally, and the other two flank the first and are disposed in grooves 41 so they may adjust laterally. Each of the guides is composed of a threaded screw 42 having a head 44 and a knurled nut 43, into which the screw 42 is threaded. As with other screws, the head 44 is held within a groove 45 to prevent undesired rotation.

To provide the necessary guiding, each screw 42 is provided with a longitudinal hole 47 extending through the screw and its head. Thus, a drill bit can be extended through the hole 47 in the screws as a guide to drill holes in the cabinet door or the drawer front in an accurate position.

To use the template as on a drawer front, for example, the cross member 12 is placed against the drawer front with the rib 13 against the upper edge of the drawer front. The device may be moved laterally until the right and left edges are equally measured from the center as indicated by the indicia lines 25 on the edge 24 of the cross member. The edge marker 15 can then be moved against the edge of the drawer front and fastened in place by tightening the nut 17 to hold the member in place. This process effectively centers the vertical leg for that particular drawer front and any others of the same dimension.

To fully locate the position of the drawer pull, the slide 30 is then moved up or down till the desired location is reached. Indicia marks 50 on the leg 11 may be used to assist in finding this location. Again when the desired location is reached, the nut 36 on the clamping screw 37 can be tightened to hold the slide in place.

If the drawer pull is held by a single screw, a hole can now be drilled through the center guide 40. If two screws are to be used, the proper spacing is set on the right and left hand guides 40 so that they can be used to guide a drill bit in drilling two laterally spaced holes. Simply by clamping the members in place, a suitable jig is established to control the location of the holes on a plurality of similar drawer fronts.

From this description, the use of the device to locate holes in a cabinet door should be obvious. Typically, the rib 13 would be laid on the edge of the door, but in other respects, the operation would be similar. A carrying handle 50 may be provided on the cross member 12 for ease in transporting the device.

I claim as my invention:

1. A template for locating pull devices on a drawer or cabinet front having a top edge, a bottom edge and two sides connecting said edges, said template comprising a T-shaped member having a cross member and a leg extending from the cross member, said cross member extending approximately equal distance on both sides of said leg, said cross member being formed with a rib to provide a top guide engageable with said top edge, edge guide means slidably mounted on said cross member and adapted to engage said sides, indicia on said cross member for positioning said edge guide means a specific distance from said leg, slide means slidably and adjustably mounted on said leg whereby the distance from said rib to said slid means can be adjusted, and drill guide means on said slide means adapted to guide a drill to drill holes in said front.

2. The template of claim 1 in which a handle is formed on said cross member by which the template can be carried.

3. The template of claim 1 in which said cross member is formed with at least one lateral side being tapered to a thin edge, said indicia being adjacent said thin edge.

4. The template of claim 1 in which said cross member is formed with separate slots on either side of the junction of said cross member with said leg, said edge guide means being composed of at least one guide slidably disposed in at least one of said slots.

5. A template for locating pull devices on a drawer or cabinet front having a top edge, a bottom edge and two sides connecting said edges, said template comprising a T-shaped member having a cross member and a leg extending from the cross member, said leg being formed with a slot running longitudinally of said leg, said cross member being formed with a rib to provide a top guide engageable with said top edge, edge guide means slidably mounted on said cross member and adapted to engage one of said sides thereby placing said template relative to said front, slide means slidably adjustably mounted on said leg whereby the distance from said rib to said slide means can be adjusted, and clamping means engageable with said slide means and slot whereby said slide means can be clamped in a definite longitudinal position on said leg, said slide means extending laterally of said leg, and including portions extending beyond the lateral edges of said leg, lateral slots formed in said portions extending laterally beyond the edges of said leg, and at least one drill guide being adjustably slidable in each of said lateral slots.

6. The template of claim 5 in which the longitudinal sliding between said plate and said leg is controlled by a tongue and groove engagement formed on said slide means and said leg to provide a smooth controlled sliding therebetween.

7. The template of claim 5 in which a third drill guide is centrally located on said slide means between said lateral slots.

8. The template of claim 5 in which each said drill guides include an extended portion perpendicular to the surface of said slide means, said extended portion being formed with a longitudinal hole adapted to receive a drill bit extending therethrough.

9. The template of claim 8 in which each extended portion includes a screw threaded part, said extended portion extending through said lateral slots, and nut means threadably engaged with said screw threaded part and engageable with said plate whereby said drill guide is adjustably mounted on said slide means.

\* \* \* \* \*